United States Patent
Dunn et al.

(10) Patent No.: US 10,126,579 B2
(45) Date of Patent: *Nov. 13, 2018

(54) RIGID LCD ASSEMBLY

(71) Applicant: Manufacturing Resources International, Inc., Alpharetta, GA (US)

(72) Inventors: William Dunn, Alpharetta, GA (US); Michael LeCave, Gainesville, GA (US)

(73) Assignee: Manfuacturing Resources International, Inc., Alpharetta, GA (US)

( * ) Notice: Subject to any disclaimer, the term of this patent is extended or adjusted under 35 U.S.C. 154(b) by 83 days.

This patent is subject to a terminal disclaimer.

(21) Appl. No.: 15/140,140

(22) Filed: Apr. 27, 2016

(65) Prior Publication Data

US 2016/0238876 A1    Aug. 18, 2016

Related U.S. Application Data

(63) Continuation of application No. 14/192,130, filed on Feb. 27, 2014, now Pat. No. 9,348,174.
(Continued)

(51) Int. Cl.
| | | |
|---|---|---|
| *G02F 1/1333* | (2006.01) | |
| *G02F 1/1335* | (2006.01) | |
| *B60R 99/00* | (2009.01) | |

(52) U.S. Cl.
CPC ........ *G02F 1/133308* (2013.01); *B60R 99/00* (2013.01); *G02F 1/133385* (2013.01);
(Continued)

(58) Field of Classification Search
CPC ......... G02F 1/133308; G02F 1/133385; G02F 1/133504; G02F 1/133603;
(Continued)

(56) References Cited

U.S. PATENT DOCUMENTS

| | | |
|---|---|---|
| 1,812,919 A | 7/1931 | Balder |
| 3,510,973 A | 5/1970 | Mazzocco, Sr. |

(Continued)

FOREIGN PATENT DOCUMENTS

| | | |
|---|---|---|
| AU | 2004283319 A1 | 5/2005 |
| AU | 2007216782 A1 | 9/2007 |

(Continued)

OTHER PUBLICATIONS

Schott, Glass Made of Ideas, OPALIKA®, 970-3d/09104-P, 2 pages, Schott North America, Inc., Germany.
(Continued)

*Primary Examiner* — Bao Q Truong
(74) *Attorney, Agent, or Firm* — Standley Law Group LLP (57) ABSTRACT

Exemplary embodiments disclosed herein provide a LCD assembly including an LED backlight, a liquid crystal display (LCD) placed in front of the LED backlight, a glass plate positioned between LED backlight and the LCD; and an optical film positioned between the glass plate and the LCD. In some embodiments, the glass plate is bonded to the rear side of the LCD, generally around the perimeter of the LCD. Preferred embodiments place a diffusing film within a cavity that is defined between the glass plate and the LCD. Some embodiments also bond the backlight cavity walls to the glass plate, on a side opposing the LCD.

20 Claims, 7 Drawing Sheets

Related U.S. Application Data (60) Provisional application No. 61/785,285, filed on Mar. 14, 2013.

(52) U.S. Cl.
CPC .. *G02F 1/133504* (2013.01); *G02F 1/133603* (2013.01); *G02F 1/133606* (2013.01); *G02F 2001/133311* (2013.01); *G02F 2001/133342* (2013.01); *G02F 2202/28* (2013.01)

(58) Field of Classification Search
CPC ... G02F 1/133606; G02F 2001/133311; G02F 2001/133342; G02F 2202/28; B60R 99/00
See application file for complete search history.

(56) References Cited

U.S. PATENT DOCUMENTS

| | | |
|---|---|---|
| 4,257,084 A | 3/1981 | Reynolds |
| 4,804,953 A | 2/1989 | Castleberry |
| 5,040,878 A | 8/1991 | Eichenlaub |
| 5,046,805 A | 9/1991 | Simon |
| 5,066,106 A | 11/1991 | Sakamoto et al. |
| 5,363,149 A | 11/1994 | Furuno et al. |
| 5,365,354 A | 11/1994 | Jannson et al. |
| 5,440,324 A | 8/1995 | Strickling, III et al. |
| 5,453,855 A | 9/1995 | Nakamura et al. |
| 5,528,720 A | 6/1996 | Winston et al. |
| 5,598,068 A | 1/1997 | Shirai |
| 5,661,578 A | 8/1997 | Habing et al. |
| 5,856,854 A | 1/1999 | Hyun |
| 6,027,222 A | 2/2000 | Oki et al. |
| 6,166,389 A | 12/2000 | Shie et al. |
| 6,307,216 B1 | 10/2001 | Huh et al. |
| 6,400,101 B1 | 6/2002 | Biebl et al. |
| 6,409,356 B1 | 6/2002 | Nishimura |
| 6,419,372 B1 | 7/2002 | Shaw et al. |
| 6,421,103 B2 | 7/2002 | Yamaguchi |
| 6,446,467 B1 | 9/2002 | Lieberman et al. |
| 6,481,130 B1 | 11/2002 | Wu |
| 6,556,258 B1 | 4/2003 | Yoshida et al. |
| 6,601,984 B2 | 8/2003 | Yamamoto et al. |
| 6,636,003 B2 | 10/2003 | Rahm et al. |
| 6,762,815 B2 | 7/2004 | Lee |
| 6,789,921 B1 | 9/2004 | Deloy et al. |
| 6,805,468 B2 | 10/2004 | Itoh et al. |
| 6,842,204 B1 | 1/2005 | Johnson |
| 6,860,628 B2 | 3/2005 | Robertson et al. |
| 6,936,968 B2 | 8/2005 | Cross et al. |
| 6,949,772 B2 | 9/2005 | Shimizu et al. |
| 6,958,743 B2 | 10/2005 | Shin et al. |
| 6,982,686 B2 | 1/2006 | Miyachi et al. |
| 7,012,379 B1 | 3/2006 | Chambers et al. |
| 7,015,650 B2 | 3/2006 | McGrath |
| 7,018,054 B2 | 3/2006 | Miyashita et al. |
| 7,025,474 B2 | 4/2006 | Campbell et al. |
| 7,038,186 B2 | 5/2006 | De Brabander et al. |
| 7,040,794 B2 | 5/2006 | Bernard |
| 7,045,828 B2 | 5/2006 | Shimizu et al. |
| 7,049,761 B2 | 5/2006 | Timmermans et al. |
| 7,053,557 B2 | 5/2006 | Cross et al. |
| 7,057,590 B2 | 6/2006 | Lim et al. |
| 7,178,963 B2 * | 2/2007 | Ueda ................ G02F 1/133606 362/561 |
| 7,190,416 B2 | 3/2007 | Paukshto et al. |
| 7,194,158 B2 | 3/2007 | Schultheis et al. |
| 7,210,839 B2 | 5/2007 | Jung et al. |
| 7,218,812 B2 | 5/2007 | Maxwell et al. |
| 7,232,250 B2 | 6/2007 | Chuang |
| 7,250,637 B2 | 7/2007 | Shimizu et al. |
| 7,259,403 B2 | 8/2007 | Shimizu et al. |
| 7,307,391 B2 | 12/2007 | Shan |
| 7,307,614 B2 | 12/2007 | Vinn |
| 7,324,080 B1 | 1/2008 | Hu et al. |
| 7,327,416 B2 * | 2/2008 | Lee ................... G02F 1/133604 349/58 |
| 7,347,706 B1 | 3/2008 | Wu et al. |
| 7,352,940 B2 | 4/2008 | Charters et al. |
| 7,375,381 B2 | 5/2008 | Shimizu et al. |
| 7,421,167 B2 | 9/2008 | Charters et al. |
| 7,427,140 B1 | 9/2008 | Ma |
| 7,473,019 B2 | 1/2009 | Laski |
| 7,481,553 B2 | 1/2009 | Kim et al. |
| 7,481,566 B2 | 1/2009 | Han |
| 7,510,299 B2 | 3/2009 | Timmermans et al. |
| 7,513,637 B2 | 4/2009 | Kelly et al. |
| 7,542,108 B2 * | 6/2009 | Saito ................ G02F 1/133604 349/58 |
| 7,546,009 B2 | 6/2009 | Kukulj et al. |
| 7,682,047 B2 * | 3/2010 | Hsu ........................ F21V 29/02 362/294 |
| 7,738,746 B2 | 6/2010 | Charters et al. |
| 7,781,979 B2 | 8/2010 | Lys |
| 7,795,574 B2 | 9/2010 | Kennedy et al. |
| 7,813,694 B2 | 10/2010 | Fishman et al. |
| 7,853,288 B2 | 12/2010 | Ma |
| 7,982,706 B2 | 7/2011 | Ichikawa et al. |
| 8,021,900 B2 | 9/2011 | Maxwell et al. |
| 8,064,744 B2 | 11/2011 | Atkins et al. |
| 8,120,595 B2 | 2/2012 | Kukulj et al. |
| 8,125,163 B2 | 2/2012 | Dunn et al. |
| 8,194,031 B2 | 6/2012 | Yao et al. |
| 8,233,115 B2 * | 7/2012 | Hadlich .............. G02F 1/133606 349/112 |
| 8,274,626 B2 | 9/2012 | Choi et al. |
| 8,294,168 B2 | 10/2012 | Park et al. |
| 8,351,013 B2 | 1/2013 | Dunn et al. |
| 8,400,430 B2 | 3/2013 | Dunn et al. |
| 8,508,155 B2 | 8/2013 | Schuch |
| 8,529,993 B2 | 9/2013 | Charters et al. |
| 8,648,993 B2 | 2/2014 | Dunn et al. |
| 8,674,390 B2 | 3/2014 | Harris et al. |
| 8,674,963 B2 | 3/2014 | Cornish et al. |
| 8,803,790 B2 | 8/2014 | Wasinger et al. |
| 8,829,815 B2 | 9/2014 | Dunn et al. |
| 8,842,366 B2 | 9/2014 | Arnett et al. |
| 9,030,129 B2 | 5/2015 | Dunn et al. |
| 9,167,655 B2 | 10/2015 | Dunn et al. |
| 9,348,174 B2 * | 5/2016 | Dunn ................ G02F 1/133606 |
| 9,812,047 B2 | 11/2017 | Schuch et al. |
| 9,867,253 B2 | 1/2018 | Dunn et al. |
| 9,924,583 B2 | 3/2018 | Schuch et al. |
| 2001/0009508 A1 | 7/2001 | Umemoto et al. |
| 2001/0033726 A1 | 10/2001 | Shie et al. |
| 2002/0043012 A1 | 4/2002 | Shibata et al. |
| 2002/0126078 A1 | 9/2002 | Horibe et al. |
| 2003/0026085 A1 * | 2/2003 | Ueda ................ G02F 1/133606 362/615 |
| 2003/0227428 A1 | 12/2003 | Nose |
| 2004/0062029 A1 | 4/2004 | Ato |
| 2004/0113044 A1 | 6/2004 | Ishiguchi |
| 2005/0094391 A1 | 5/2005 | Campbell et al. |
| 2005/0105303 A1 | 5/2005 | Emde |
| 2005/0117323 A1 | 6/2005 | King |
| 2005/0140848 A1 | 6/2005 | Yoo et al. |
| 2005/0162737 A1 | 7/2005 | Whitehead et al. |
| 2005/0265019 A1 | 12/2005 | Sommers et al. |
| 2006/0012985 A1 | 1/2006 | Archie, Jr. et al. |
| 2006/0055012 A1 | 3/2006 | Hsin Chen et al. |
| 2006/0077686 A1 | 4/2006 | Han et al. |
| 2006/0082700 A1 | 4/2006 | Gehlsen et al. |
| 2006/0087521 A1 | 4/2006 | Chu et al. |
| 2006/0092346 A1 | 5/2006 | Moon et al. |
| 2006/0092348 A1 | 5/2006 | Park |
| 2006/0125418 A1 | 6/2006 | Bourgault |
| 2006/0197474 A1 | 9/2006 | Olsen |
| 2006/0221612 A1 | 10/2006 | Song et al. |
| 2006/0238367 A1 | 10/2006 | Tsuchiya |
| 2006/0262079 A1 | 11/2006 | Seong et al. |
| 2006/0279946 A1 | 12/2006 | Park et al. |
| 2006/0289201 A1 | 12/2006 | Kim et al. |
| 2007/0013647 A1 | 1/2007 | Lee et al. |
| 2007/0013828 A1 | 1/2007 | Cho et al. |

(56) References Cited

U.S. PATENT DOCUMENTS

| | | |
|---|---|---|
| 2007/0021217 A1 | 1/2007 | Wu |
| 2007/0070615 A1 | 3/2007 | Joslin et al. |
| 2007/0097321 A1 | 5/2007 | Whitehead et al. |
| 2007/0115686 A1 | 5/2007 | Tyberghien |
| 2007/0139574 A1 | 6/2007 | Ko et al. |
| 2007/0139929 A1 | 6/2007 | Yoo et al. |
| 2007/0147037 A1 | 6/2007 | Wang |
| 2007/0153515 A1 | 7/2007 | Hong et al. |
| 2007/0171353 A1 | 7/2007 | Hong |
| 2007/0171623 A1 | 7/2007 | Zagar et al. |
| 2007/0177071 A1 | 8/2007 | Egi et al. |
| 2007/0195535 A1 | 8/2007 | Artwohl et al. |
| 2007/0198638 A1 | 8/2007 | Omura et al. |
| 2007/0206158 A1 | 9/2007 | Kinoshita et al. |
| 2007/0222910 A1 | 9/2007 | Hu |
| 2007/0230218 A1 | 10/2007 | Jachim et al. |
| 2007/0268234 A1 | 11/2007 | Wakabayashi et al. |
| 2007/0297163 A1 | 12/2007 | Kim et al. |
| 2007/0297172 A1 | 12/2007 | Furukawa et al. |
| 2008/0019147 A1 | 1/2008 | Erchak et al. |
| 2008/0036940 A1 | 2/2008 | Song et al. |
| 2008/0043463 A1 | 2/2008 | Park et al. |
| 2008/0049164 A1 | 2/2008 | Jeon et al. |
| 2008/0068836 A1 | 3/2008 | Hatanaka et al. |
| 2008/0089064 A1 | 4/2008 | Wang |
| 2008/0101086 A1 | 5/2008 | Lee |
| 2008/0106527 A1 | 5/2008 | Cornish et al. |
| 2008/0111949 A1 | 5/2008 | Shibata et al. |
| 2008/0143916 A1 | 6/2008 | Fujino et al. |
| 2008/0151527 A1 | 6/2008 | Ueno et al. |
| 2008/0170178 A1 | 7/2008 | Kubota et al. |
| 2008/0170400 A1 | 7/2008 | Maruyama |
| 2008/0212305 A1 | 9/2008 | Kawana et al. |
| 2008/0231196 A1 | 9/2008 | Weng et al. |
| 2008/0276507 A1 | 11/2008 | Hines |
| 2008/0284942 A1 | 11/2008 | Mahama et al. |
| 2009/0002990 A1 | 1/2009 | Becker et al. |
| 2009/0009102 A1 | 1/2009 | Kahlman et al. |
| 2009/0015755 A1 | 1/2009 | Bang et al. |
| 2009/0021461 A1 | 1/2009 | Hu et al. |
| 2009/0033612 A1 | 2/2009 | Roberts et al. |
| 2009/0058795 A1 | 3/2009 | Yamazaki |
| 2009/0061945 A1 | 3/2009 | Ma |
| 2009/0085859 A1 | 4/2009 | Song |
| 2009/0091634 A1 | 4/2009 | Kennedy et al. |
| 2009/0109165 A1 | 4/2009 | Park et al. |
| 2009/0135167 A1 | 5/2009 | Sakai et al. |
| 2009/0135583 A1 | 5/2009 | Hillman et al. |
| 2009/0174840 A1 | 7/2009 | Lee et al. |
| 2009/0196069 A1 | 8/2009 | Iwasaki |
| 2009/0243501 A1 | 10/2009 | Dunn et al. |
| 2009/0284457 A1 | 11/2009 | Botzas et al. |
| 2009/0289580 A1 | 11/2009 | Dunn et al. |
| 2010/0039440 A1 | 2/2010 | Tanaka et al. |
| 2010/0102735 A1 | 4/2010 | Chang et al. |
| 2010/0109553 A1 | 5/2010 | Chang et al. |
| 2010/0165240 A1 | 7/2010 | Cho et al. |
| 2010/0194296 A1 | 8/2010 | Park |
| 2010/0220258 A1 | 9/2010 | Dunn et al. |
| 2010/0231563 A1 | 9/2010 | Dunn et al. |
| 2010/0307800 A1 | 12/2010 | Wee et al. |
| 2010/0313592 A1 | 12/2010 | Pae |
| 2011/0007228 A1 | 1/2011 | Yoon et al. |
| 2011/0013114 A1 | 1/2011 | Dunn et al. |
| 2011/0083460 A1 | 4/2011 | Thomas et al. |
| 2011/0102704 A1 | 5/2011 | Dunn et al. |
| 2011/0116000 A1 | 5/2011 | Dunn et al. |
| 2011/0141724 A1 | 6/2011 | Erion |
| 2011/0164434 A1 | 7/2011 | Derichs |
| 2011/0205145 A1 | 8/2011 | Lin et al. |
| 2011/0242437 A1 | 10/2011 | Yoo et al. |
| 2011/0242839 A1 | 10/2011 | Dunn et al. |
| 2011/0283199 A1 | 11/2011 | Schuch et al. |
| 2012/0050958 A1 | 3/2012 | Sanford et al. |
| 2012/0062819 A1 | 3/2012 | Dunn et al. |
| 2012/0086344 A1 | 4/2012 | Schuch |
| 2012/0098794 A1 | 4/2012 | Kleinert et al. |
| 2012/0134139 A1 | 5/2012 | Jang et al. |
| 2012/0154712 A1 | 6/2012 | Yu et al. |
| 2012/0212520 A1 | 8/2012 | Matsui et al. |
| 2012/0242926 A1 | 9/2012 | Hsu et al. |
| 2012/0250329 A1 | 10/2012 | Suehiro et al. |
| 2012/0274882 A1 | 11/2012 | Jung |
| 2012/0299891 A1 | 11/2012 | Fujiwara et al. |
| 2012/0314447 A1 | 12/2012 | Huang |
| 2012/0327039 A1 | 12/2012 | Kukulj |
| 2013/0016080 A1 | 1/2013 | Dunn et al. |
| 2013/0016296 A1 | 1/2013 | Fujita et al. |
| 2013/0027633 A1 | 1/2013 | Park et al. |
| 2013/0063326 A1 | 3/2013 | Riegel |
| 2013/0094160 A1 | 4/2013 | Narumi |
| 2013/0163277 A1 | 6/2013 | Kim et al. |
| 2013/0258659 A1 | 10/2013 | Erion |
| 2013/0278868 A1 | 10/2013 | Dunn et al. |
| 2014/0016355 A1 | 1/2014 | Ajichi |
| 2014/0078407 A1 | 3/2014 | Green et al. |
| 2014/0085564 A1 | 3/2014 | Hendren et al. |
| 2014/0104538 A1 | 4/2014 | Park et al. |
| 2014/0134767 A1 | 5/2014 | Ishida et al. |
| 2014/0144083 A1 | 5/2014 | Artwohl et al. |
| 2014/0268657 A1 | 9/2014 | Dunn et al. |
| 2014/0285477 A1 | 9/2014 | Cho et al. |
| 2014/0340375 A1 | 11/2014 | Dunn et al. |
| 2014/0361969 A1 | 12/2014 | Wasinger et al. |
| 2015/0009653 A1 | 1/2015 | Dunn et al. |
| 2015/0153506 A1 | 6/2015 | Dunn |
| 2015/0219954 A1 | 8/2015 | Kubo |
| 2015/0226996 A1 | 8/2015 | Ohashi |
| 2015/0245443 A1 | 8/2015 | Dunn et al. |
| 2015/0346525 A1 | 12/2015 | Wolf et al. |
| 2016/0037606 A1 | 2/2016 | Dunn et al. |
| 2016/0103275 A1 | 4/2016 | Diaz et al. |
| 2016/0238876 A1 | 8/2016 | Dunn et al. |
| 2016/0334666 A1 | 11/2016 | Liu |
| 2016/0335705 A1 | 11/2016 | Williams et al. |
| 2016/0338181 A1 | 11/2016 | Schuch et al. |
| 2016/0338182 A1 | 11/2016 | Schuch et al. |
| 2016/0351133 A1 | 12/2016 | Kim et al. |
| 2016/0358538 A1 | 12/2016 | Schuch et al. |
| 2017/0059938 A1 | 3/2017 | Brown et al. |
| 2017/0248823 A1 | 8/2017 | Dunn et al. |
| 2018/0012566 A1 | 1/2018 | Lin et al. |
| 2018/0048849 A1 | 2/2018 | Dunn |
| 2018/0061297 A1 | 3/2018 | Schuch et al. |

FOREIGN PATENT DOCUMENTS

| | | |
|---|---|---|
| CA | 2536130 A1 | 5/2005 |
| CA | 2686214 A1 | 11/2008 |
| CN | 1836179 A | 9/2006 |
| CN | 101432647 B | 5/2007 |
| CN | 101048685 A | 10/2007 |
| CN | 101339272 A | 1/2009 |
| CN | 101351765 A | 1/2009 |
| CN | 101681222 A | 3/2010 |
| EP | 0313331 | 4/1989 |
| EP | 1678534 A1 | 7/2006 |
| EP | 1805539 A1 | 7/2007 |
| EP | 2156276 A4 | 5/2008 |
| EP | 1941342 A1 | 7/2008 |
| GB | 153110 | 11/1920 |
| IN | 30/2007 | 2/2006 |
| IN | 03/2009 | 5/2008 |
| IN | 15/2010 | 12/2009 |
| JP | 11095214 A | 4/1999 |
| JP | 2002064842 | 2/2002 |
| JP | 2002209230 | 7/2002 |
| JP | 2004004581 A | 1/2004 |
| JP | 2007509372 B2 | 10/2004 |
| JP | 2004-325629 A | 11/2004 |
| JP | 2005228996 A | 8/2005 |
| JP | 2005236469 | 9/2005 |
| JP | 2005292939 A | 10/2005 |
| JP | 2008518251 A | 10/2005 |

(56) References Cited

FOREIGN PATENT DOCUMENTS

| | | | |
|---|---|---|---|
| JP | 2005332253 A | 12/2005 |
| JP | 2006198344 A | 8/2006 |
| JP | 2007080872 A | 3/2007 |
| JP | 2009535723 A5 | 5/2007 |
| JP | 2008-76755 A | 4/2008 |
| JP | 2008112719 A | 5/2008 |
| JP | 2008256819 A | 10/2008 |
| JP | 2009036964 A | 2/2009 |
| JP | 2009512898 A | 3/2009 |
| JP | 2009231473 A | 10/2009 |
| JP | 2010509622 A | 3/2010 |
| JP | 2010527100 A | 8/2010 |
| JP | 2010-282109 A | 12/2010 |
| JP | 2011081424 A | 4/2011 |
| KR | 200286961 Y1 | 8/2002 |
| KR | 1020070003755 A | 2/2006 |
| KR | 20070005637 A | 1/2007 |
| KR | 1020070084554 A | 5/2007 |
| KR | 20080013592 A | 2/2008 |
| KR | 20080063414 A | 7/2008 |
| KR | 20080074972 A | 8/2008 |
| KR | 1020090007776 A | 1/2009 |
| KR | 20100019997 A | 2/2010 |
| KR | 1020050033986 A | 4/2014 |
| KR | 101796718 A | 11/2017 |
| TW | 200615598 A | 5/2006 |
| TW | 200802054 A | 1/2008 |
| TW | 200808925 A | 2/2008 |
| TW | 200809285 A | 2/2008 |
| TW | 200809287 A | 2/2008 |
| TW | 200828093 A | 7/2008 |
| TW | 200912200 A | 3/2009 |
| TW | 201030376 A | 8/2010 |
| TW | 201038114 A | 10/2010 |
| WO | WO9608892 | 3/1996 |
| WO | WO2005051054 A2 | 6/2005 |
| WO | 2005/093703 A1 | 10/2005 |
| WO | WO2006001559 A1 | 1/2006 |
| WO | WO2006109237 A1 | 10/2006 |
| WO | WO2007052777 A1 | 5/2007 |
| WO | WO2005040873 A1 | 5/2008 |
| WO | WO2008138049 A | 11/2008 |
| WO | 2008/152832 A1 | 12/2008 |
| WO | WO2009004574 A1 | 1/2009 |
| WO | 2010/080624 A2 | 7/2010 |
| WO | WO2010080624 | 7/2010 |
| WO | WO2010129271 A2 | 11/2010 |
| WO | WO2011100429 A2 | 8/2011 |
| WO | WO2011143719 | 11/2011 |
| WO | WO2014158642 A1 | 10/2014 |
| WO | WO2015003130 A1 | 1/2015 |
| WO | WO2018031753 A1 | 2/2018 |

OTHER PUBLICATIONS

Ross, Dave, How Transmissive Film Works, Jul. 10, 2008, 9 pages, HowStuffWorks.com. http://computerhowstuffworks.com/transmissive-film.htm downloaded Mar. 8, 2016.
Wikipedia, Gradient-index optics, 2016.
Patrick Frantz & Deania Fernandez, Printed Circuit Boards (PCBs), Feb. 18, 2004, 2 Pages, Version 1.1.
Teravision Corp., LCD-TV Panel Control Board Specification, Nov. 2007, 24 Pages.
Supertex Inc., Constant Off-time, Buck-based LED Drivers Using HV9910, Nov. 2, 2004, 4 Pages.
Grin Tech, Grin Lenses, Aug. 25, 2016, 4 Pages.
Supertex Inc., Universal High Brightness LED Driver, 2007, 8 Pages.
Shigeru Aoyama, Akihiro Funamoto & Koichi Imanaka, Hybrid normal-reverse prism coupler for light-emitting diode backlight systems, Oct. 1, 2006, 6 Pages, vol. 45, No. 28.
Panel-Brite, Inc., High Brightness LED Backlight Technology, Mar. 11, 2009, 1 Page.
RPO, How Digital Waveguide Touch Works, Sep. 15, 2011, 1 Page.
Dave Roos, How Transmissive Film Works, article, 2008, 9 pages.
Schott, Glass made of Ideas—OPALIKA, 2016, 2 pages.
Mandan, LED Backlight: Enhancement of picture quality on LCD screen, Oct. 8-12, 2006, 5 pages.
Lu, Color shift reduction of a multi-domain IPS-LCD using RGB-LED backlight, 2006, 10 pages.
Anandan, LED Backlight: Enhancement of picture quality on LCD screen, Oct. 8-12, 2006, 5 pages.

\* cited by examiner

RIGID LCD ASSEMBLY

CROSS-REFERENCE TO RELATED APPLICATIONS

This application claims priority to U.S. application Ser. No. 14/192,130 filed on Feb. 27, 2014 which claims priority to U.S. Provisional Application No. 61/785,285, filed on Mar. 14, 2013, all of which are herein incorporated by reference in their entirety.

TECHNICAL FIELD

Embodiments generally relate to liquid crystal display assemblies.

BACKGROUND OF THE ART

Liquid crystal displays (LCDs) are now being used in many environments which are not protected from direct sunlight, shock, or high/low ambient temperatures. Specifically, it is now desirable to place LCDs on a moving vehicle, typically for advertising or informational purposes. While they can be placed anywhere on the vehicle, it is sometimes preferred to place the LCDs atop the vehicle, attached to the roof. Of course, traditional LCDs are not capable of withstanding the impacts of sunlight, weather, high/low ambient temperatures, as well as the shock that would be transferred to the LCD when the vehicle hits potholes, curbs, speed bumps, and sometimes other vehicles.

The various layers used to construct an LCD are typically very thin, as the thinner LCD assemblies have been more popular in the marketplace and are typically more appealing to the consumer. However, thin components have been difficult to form into a resulting assembly that is durable enough to withstand this particular application and all of the competing environmental factors, while still producing a very bright, high quality image that does not degrade over time.

SUMMARY OF THE EXEMPLARY EMBODIMENTS

Exemplary embodiments disclosed herein provide a rigid LCD assembly including a LCD having a perimeter, a first layer of tape around the perimeter of the LCD, and a diffusing plate attached to the later of tape so as to create a cavity defined by the space between the LCD, tape, and diffusing plate. One or more optical films may be inserted into the cavity, and while constricted in directions perpendicular to the films, the films may be free to move slightly in the directions parallel to the films. A U-shaped backlight wall may attach to the diffusing plate and would contain a backlight. An optional thermal plate can be attached to the backlight wall, which can be used with a second thermal plate to define a channel for accepting cooling air.

The foregoing and other features and advantages of the exemplary embodiments of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which.

DETAILED DESCRIPTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
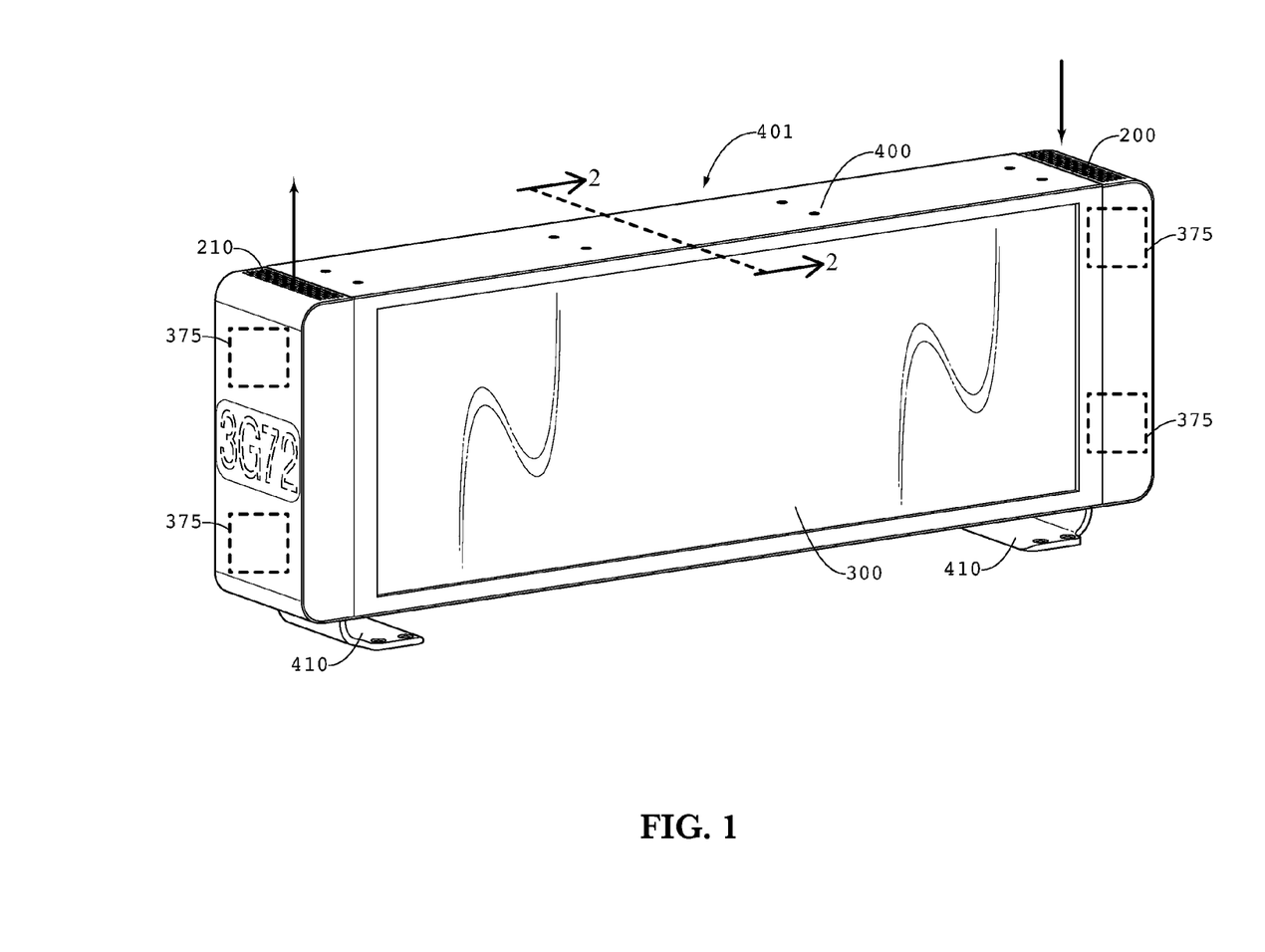
FIG. 1 is a perspective view of a car top assembly for back to back LCDs and showing the section line 2-2.

FIG. 1 is a perspective view of a car top assembly 401 for back to back LCDs and showing the section line 2-2. A housing 400 contains and protects the components and has mounting plates 410 as well as an external air inlet 200 and external air outlet 210. The housing 400 is preferably metal but this is not required. A transparent protective plate 300 is used to protect the internal LCD. In an exemplary embodiment the plate 300 would be glass and would contain at least one anti-reflective layer or coating. In some embodiments the plate 300 may be a single pane of tempered glass while in other embodiments the plate 300 may be two pieces of anti-reflective glass laminated together with optical adhesive.

Fans 375 may be positioned within the housing 400 to force the external air through the inlet 200 and outlet 210. Fans 375 could be positioned anywhere within the housing 400, but are preferably near either the inlet 200 or outlet 210. Fans 375 may be placed near both the inlet 200 and outlet 210 or only near one of the two. Section line 2-2 is shown cutting vertically through the assembly 401.

Figure 2:
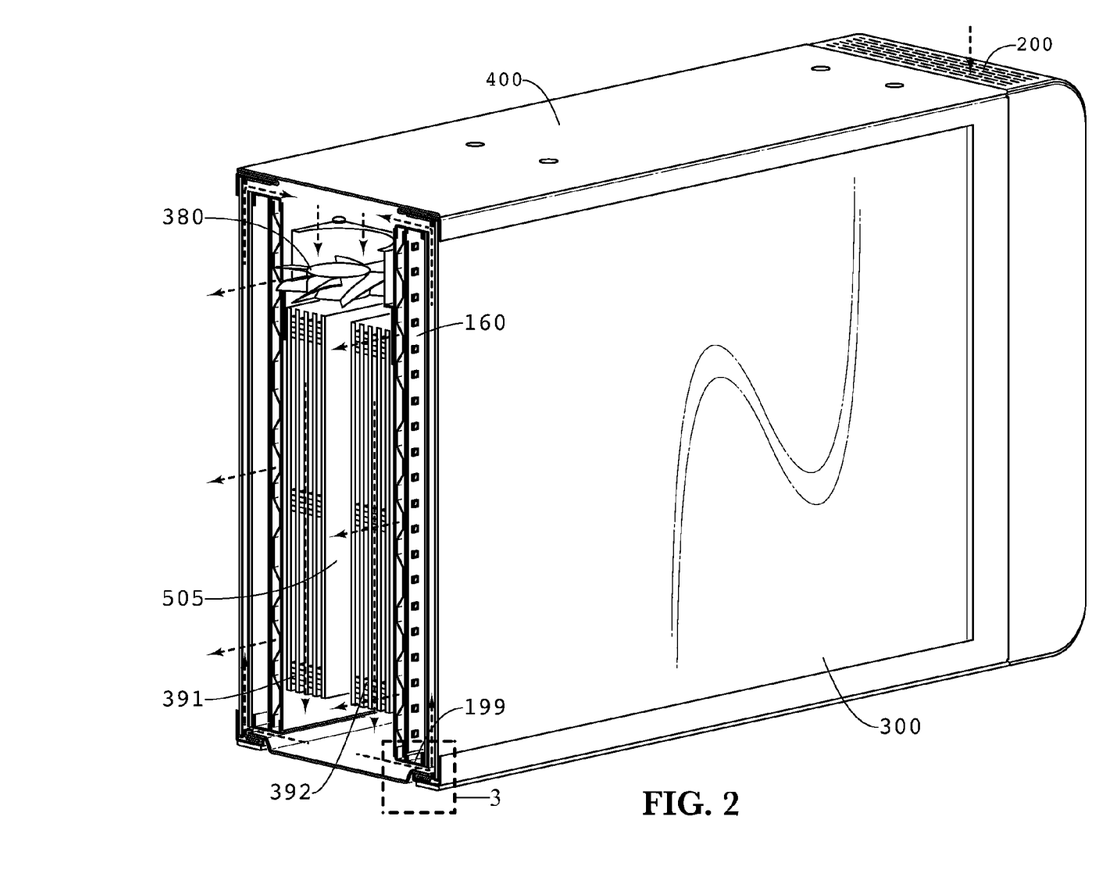
FIG. 2 is a perspective section view of the car top assembly taken from section line 2-2 and showing the location for detail 3.

FIG. 2 is a perspective section view of the car top assembly taken from section line 2-2 and showing the location for detail 3. In an exemplary embodiment, the assembly is substantially symmetrical about a vertical center plane, so the assembly will be described mostly with reference to a first side, as the second side is substantially the same. Both the first and second sides preferably contain an embodiment of the rigid LCD assembly 199. The assembly preferably contains two paths for cooling air. The first path (open loop) is external air which is drawn through the inlet 200 and preferably forced through a first heat exchanger 392, second heat exchanger 391, behind a first backlight 160, and behind a second backlight (for the opposing LCD). The open loop is forced by the fans 375 described above.

The second path (closed loop) is used to force circulating air through a first heat exchanger 392, second heat exchanger 391, between the protective plate 300 and a first LCD, and between a second protective plate and a second LCD. The circulating gas is preferably forced through the closed loop path by fan 380, which could be placed anywhere in the path of the closed loop, but here is shown above the first and second heat exchangers 392 and 391. The second path (closed loop) can be thought of as a single figure-8 type flow or a combination of loops. The first loop can be described as beginning at the fan 380, travelling through the heat exchanger 392, continuing between the rigid LCD assembly 199 and the transparent protective plate 300, and finally returning to the fan 380. The second loop would also begin at the fan 380, but would instead travel through the heat exchanger 391, continuing between the opposing LCD assembly and the opposing transparent protective plate, and finally returning to the fan 380.

Preferably, the circulating air traveling through the closed loop is not permitted to mix with the external air travelling through the open loop. This prevents dust, water vapor, pollen, and other contaminates from entering sensitive portions of the display, specifically the gap 505 between the two heat exchangers as well as the gap between the rigid LCD assembly 199 and the transparent protective plate 300. The gap 505 is preferably used to house the electronics for powering and driving the rigid LCD assemblies.

Figure 3:
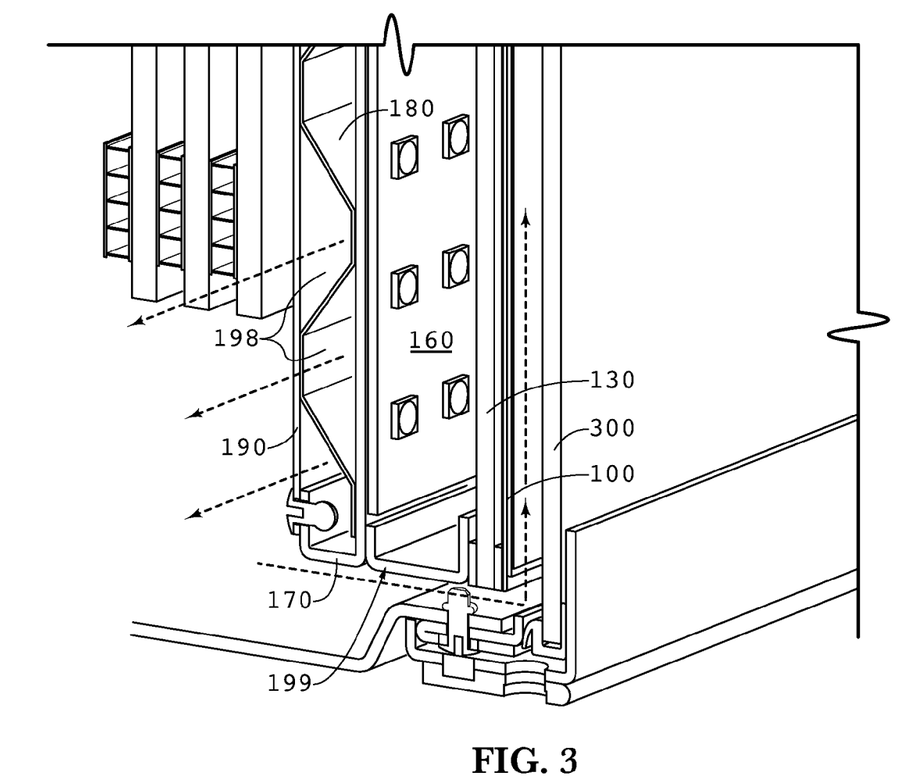
FIG. 3 is a perspective section view of detail 3.

FIG. 3 is a perspective section view of detail 3. The rigid LCD assembly 199 preferably contains an LCD 100 as the outermost layer. A gap is preferably defined between the LCD 100 and the plate 300, which accepts the closed loop circulating gas. The backlight 160 is positioned behind the diffuser 130 and is preferably in conductive thermal communication with a front thermal plate 170. A corrugated layer 180 is preferably sandwiched between the front thermal plate 170 and a rear thermal plate 190. Preferably, the corrugated layer 180 is in conductive thermal communication with the front thermal plate 170 and rear thermal plate 190. In an exemplary embodiment, the front thermal plate 170, rear thermal plate 190, and corrugated layer 180 are all comprised of metal and even more preferably of aluminum or stainless steel. Also in an exemplary embodiment, the corrugated layer 180 would contact the front thermal plate 170 and rear thermal plate 190 in an alternating fashion.

A series of channels 198 are preferably defined by the combination of the front thermal plate 170, rear thermal plate 190, and corrugated layer 180. The channels 198 guide the open loop air and allow heat to be removed from the backlight 160 by transferring to the heat to the front thermal plate 170, rear thermal plate 190, and corrugated layer 180. In some embodiments, the corrugate layer 180 may not be used, but the open loop air is simply forced between the front thermal plate 170 and rear thermal plate 190.

Figure 4:
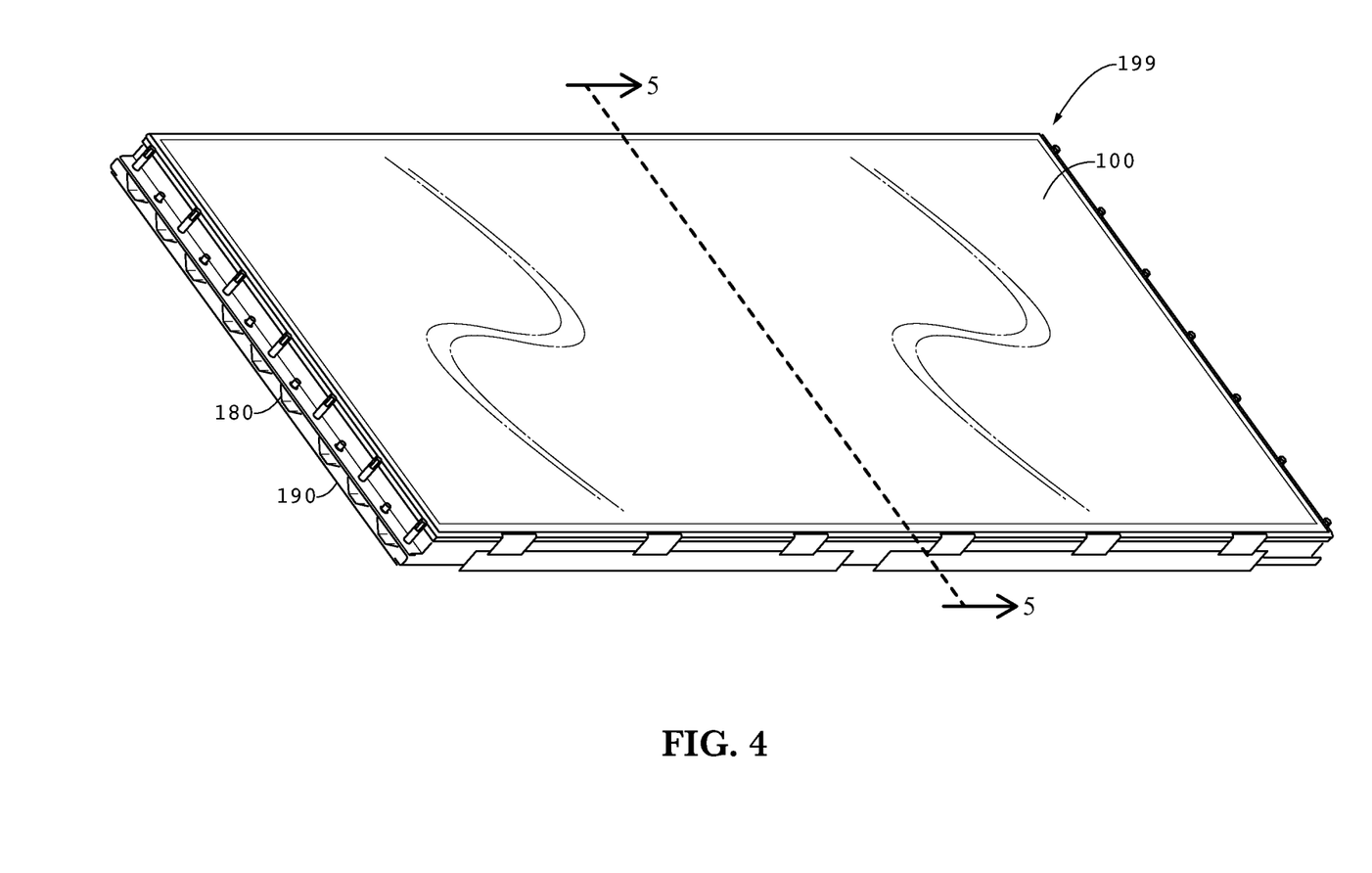
FIG. 4 is a perspective view of an exemplary embodiment for the rigid LCD assembly and showing the section line 5-5.
Figure 5:
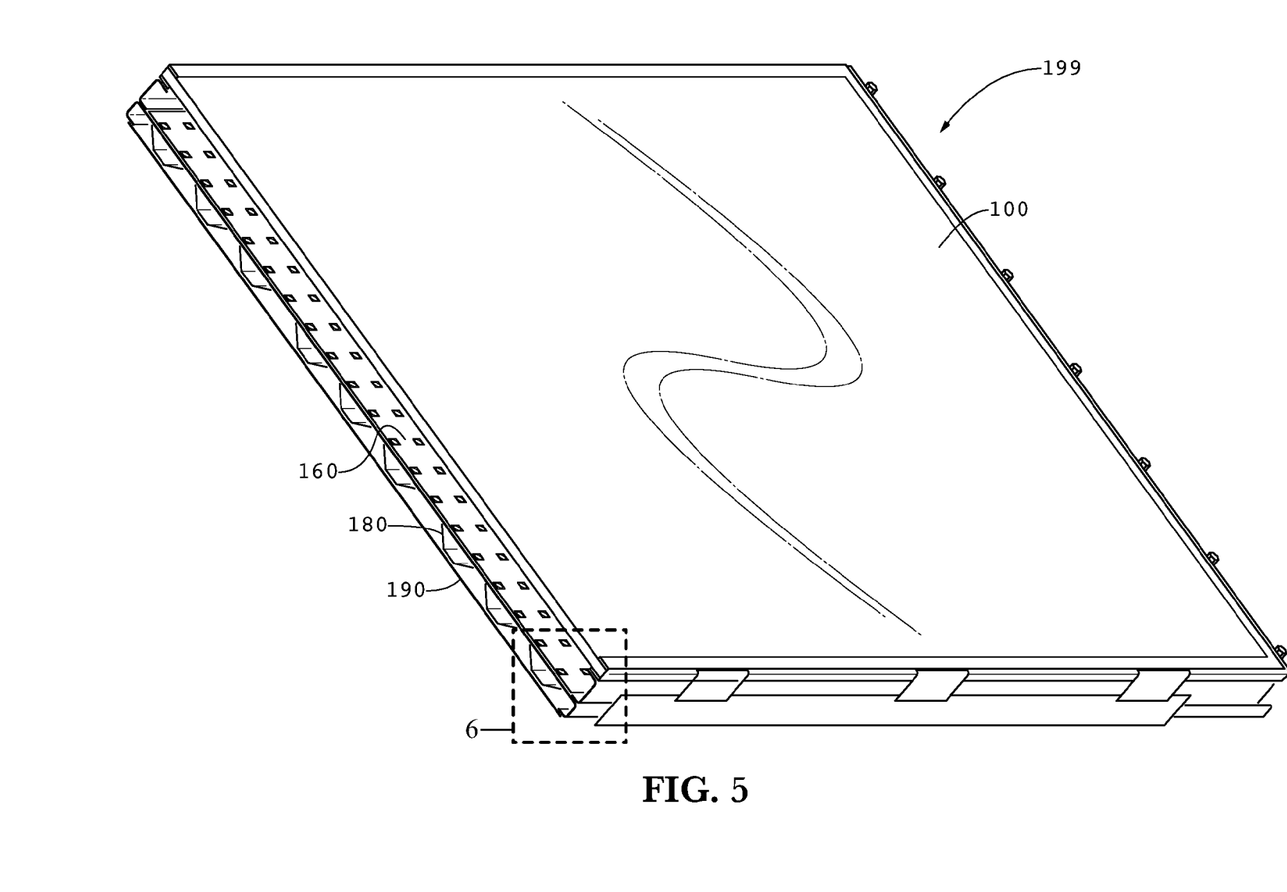
FIG. 5 is a perspective section view taken from section line 5-5 and showing detail 6.

FIG. 4 is a perspective view of an exemplary embodiment for the rigid LCD assembly 199 and showing the section line 5-5. As shown, an exemplary embodiment for the rigid LCD assembly 199 would contain each layer found between the LCD 100 and the rear thermal plate 190. FIG. 5 is a perspective section view taken from section line 5-5 and showing detail 6.

Figure 6:
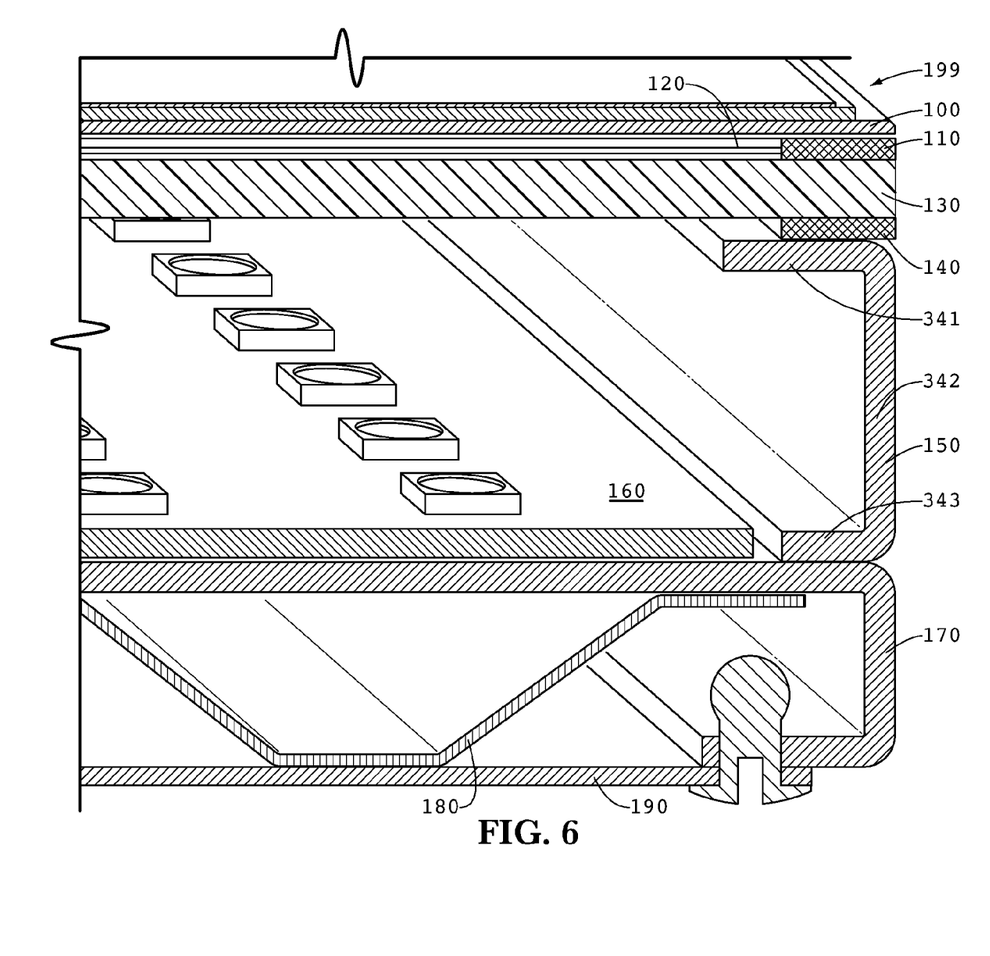
FIG. 6 is a perspective section view of detail 6.

FIG. 6 is a perspective section view of detail 6. A layer of adhesive 110 is preferably used to bond the LCD 100 to a diffuser plate 130, sandwiching one or more optical films 120 in between the LCD 100 and the diffuser plate 130. It is preferable to provide the adhesive 110 in a thickness that is approximately equal to the thickness of the optical films 120 as this would prevent the films from shifting, bunching, or buckling due to thermal or shock issues. It may be preferable to constrain the optical films in a cavity (defined between the LCD 100, diffuser plate 130, and adhesive 110) that is approximately the same thickness as the optical films 120 but has a length and width which is slightly larger than the films, to allow for thermal expansion/contraction without buckling. In other words, it may be preferable to allow the optical films 120 to float within the directions parallel to the films themselves, while constraining the films to prevent movement within directions perpendicular to the optical films 120. The adhesive 110 is generally placed around the perimeter of the diffuser plate 130.

While not required, it is preferable that the diffuser plate 130 is a glass plate, which helps to provide rigidity to the assembly. In an exemplary embodiment, the diffuser plate 130 is a glass plate with a coating or treatment on the front surface which causes the diffusion of the light. In some embodiments the front surface of the glass may have a thin white flashed layer. In a preferred embodiment, the diffuser plate 130 would comprise Opalika® filterglass from Schott North America. The data sheet for Opalika® filterglass can be found at www.us.schott.com/architecture and is herein incorporated by reference in its entirety. It should be noted that while a plate is preferred for the diffuser 130, a traditional diffuser film or plastic plate could also be used in some embodiments.

Another layer of adhesive 140 is preferably used to bond the diffuser plate 130 to the backlight cavity walls 150, which in an exemplary embodiment have a U-shaped cross-section and would be formed sheet metal. The backlight cavity walls 150 are preferably attached to the front thermal plate 170, which is preferably in contact with the backlight 160. The backlight 160 is preferably a metal printed circuit board having a plurality of LEDs. The rear thermal plate 190 may be attached to the front thermal plate 170 so as to interpose the corrugated layer 180 in between. The layer of adhesive 140 is preferably placed around the perimeter of the diffuser 130.

In a preferred embodiment, the backlight cavity walls 150 would have a U-shaped cross-section defined by a top ledge 341 with a top surface, bottom ledge 343 with a bottom surface, and a sidewall 342 connecting the top ledge 341 with the bottom ledge 343. In a preferable arrangement, the top ledge 341 and bottom ledge 343 would be substantially parallel and the sidewall 342 would be substantially perpendicular to the top ledge 341 and bottom ledge 343. Preferably, the top surface of the top ledge 341 would attach to the adhesive 140 while the bottom surface of the bottom ledge 343 would attach to the front thermal plate 170.

The adhesive layers 140 and 110 could be any number of adhesives, but are preferably very high bond (VHB) tape. In this way, the thickness of the VHB tape could be selected to be similar to the thickness of the optical films 120. Although not required, the adhesive layers 140 and 110 would preferably run all around the perimeter of the assembly 199 so as to completely seal each of the layers and prevent dust and contaminates to enter the assembly and disrupt any resulting images or damage the components.

Figure 7:
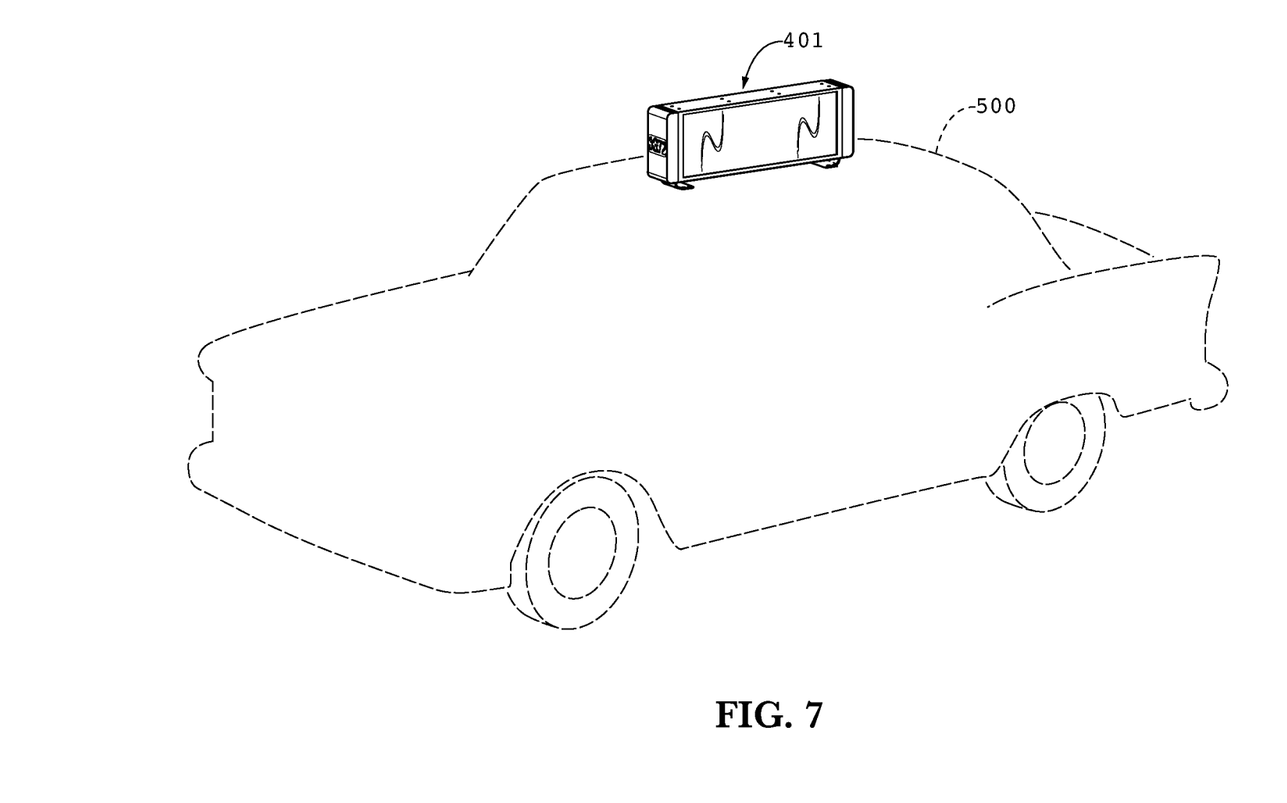
FIG. 7 is a perspective illustration of the car top LCD assembly of FIG. 1 shown mounted atop an automobile.

FIG. 7 is a perspective illustration of the car top LCD assembly 401 of FIG. 1 shown mounted atop an automobile 500.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

We claim:

1. A LCD assembly comprising:
an LED backlight;
a liquid crystal display (LCD) placed in front of the LED backlight;
a glass plate positioned between LED backlight and the LCD such that a perimeter of the glass plate is secured to the LCD and a cavity is defined between the glass plate and the LCD; and
an optical film positioned in the cavity between the glass plate and the LCD.

2. The LCD assembly of claim 1 wherein:
the optical film is a diffusing film.

3. The LCD assembly of claim 1 wherein:
the glass plate is fixed relative to the LCD.

4. The LCD assembly of claim 1 further comprising:
backlight cavity walls which are bonded to the glass plate.

5. The LCD assembly of claim 4 wherein:
the backlight cavity walls have a U-shaped cross section.

6. The LCD assembly of claim 4 wherein:
the backlight cavity walls comprise
a top ledge which attaches to the glass plate,
a bottom ledge substantially parallel to the top ledge, and
a sidewall which connects the top ledge with the bottom ledge.

7. The LCD assembly of claim 4 further comprising:
a front thermal plate attached to the backlight cavity walls where the backlight is attached to the front thermal plate.

8. The LCD assembly of claim 7 further comprising:
a fan positioned to force external air along the front thermal plate.

9. The LCD assembly of claim 6 further comprising:
a rear thermal plate positioned opposite to the front thermal plate where the space between the front and rear thermal plates defines a gap; and
a fan positioned to force external air through said gap.

10. The LCD assembly of claim 9 further comprising:
a corrugated layer placed within the gap.

11. The LCD assembly of claim 10 wherein:
the corrugated layer contacts the front thermal plate and rear thermal plate in an alternating fashion throughout the gap.

12. A LCD assembly comprising:
a liquid crystal display (LCD);
a glass plate positioned behind the LCD such that a perimeter of the glass plate is secured to the LCD;
backlight cavity walls attached to the glass plate by a layer of adhesive which traverses the majority of the perimeter of the glass plate; and
a backlight placed within the backlight cavity walls.

13. The LCD assembly of claim 12 wherein:
the backlight cavity walls have a U-shaped cross section.

14. The LCD assembly of claim 12 wherein:
the backlight cavity walls comprise
a top ledge which attaches to the plate with the layer of adhesive,
a bottom ledge substantially parallel to the top ledge, and
a sidewall which connects the top ledge with the bottom ledge.

15. The LCD assembly of claim 12 further comprising:
a cavity defined between the LCD and glass plate; and
an optical film placed within the cavity.

16. The LCD assembly of claim 15 wherein:
the optical film comprises a diffusing film.

17. The LCD assembly of claim 15 wherein:
the optical film is permitted to move within the cavity, in directions parallel to the film.

18. A LCD assembly comprising:
a liquid crystal display (LCD) having a backside;
a glass plate bonded to the backside of the LCD, defining a cavity in between the LCD and the glass plate;
a diffusing film placed within the cavity; and
a backlight positioned behind the glass plate.

19. The LCD assembly of claim 18 wherein:
the diffusing film is permitted to move within the cavity.

20. The LCD assembly of claim 18 further comprising:
backlight cavity walls which are bonded to the glass plate on a side which opposes the LCD.

* * * * *

UNITED STATES PATENT AND TRADEMARK OFFICE
CERTIFICATE OF CORRECTION

PATENT NO. : 10,126,579 B2
APPLICATION NO. : 15/140140
DATED : November 13, 2018
INVENTOR(S) : William Dunn and Michael LeCave It is certified that error appears in the above-identified patent and that said Letters Patent is hereby corrected as shown below:

On page 4, under Other Publications, please delete "Mandan, LED Backlight: Enchancement of picture quality on LCD screen, Oct. 8-12, 2006, 5 pages."

Signed and Sealed this
Eleventh Day of December, 2018

Andrei Iancu
*Director of the United States Patent and Trademark Office*